4 Sheets—Sheet 1.

J. W. TUFTS.

PROCESS OF MAKING ELECTROTYPE DIES.

No. 10,956. Reissued Aug. 28, 1888.

Witnesses:
Jos. A. Ryan,
L. E. Lewis.

James W. Tufts,
Inventor,
By Chas. E. Barber,
His atty. in fact.

THE NORRIS PETERS CO., PHOTO-LITHO., WASHINGTON, D. C.

J. W. TUFTS.

PROCESS OF MAKING ELECTROTYPE DIES.

No. 10,956. Reissued Aug. 28, 1888.

Witnesses:
Jos. A. Ryan.
L. E. Lewis,

James W. Tufts.
Inventor.
By Chas. E. Barber.
His atty in fact.

THE HORRIS PETERS CO., PHOTO-LITHO., WASHINGTON, D. C.

4 Sheets—Sheet 3.

J. W. TUFTS.

PROCESS OF MAKING ELECTROTYPE DIES.

No. 10,956. Reissued Aug. 28, 1888.

Witnesses,
Jos. A. Ryan,
L. D. Lewis.

James W. Tufts.
Inventor.
By Chas. E. Barber.
His atty in fact

THE NORRIS PETERS CO., PHOTO-LITHO., WASHINGTON, D. C.

J. W. TUFTS.

PROCESS OF MAKING ELECTROTYPE DIES.

No. 10,956. Reissued Aug. 28, 1888.

James W. Tufts
Inventor,
By Chas. E. Barber
His atty. in fact.

Witnesses.
Jos. A. Ryan
L. D. Lewis.

THE NORRIS PETERS CO., PHOTO-LITHO., WASHINGTON, D. C.

UNITED STATES PATENT OFFICE.

JAMES W. TUFTS, OF MEDFORD, MASSACHUSETTS.

PROCESS OF MAKING ELECTROTYPE-DIES.

SPECIFICATION forming part of Reissued Letters Patent No. 10,956, dated August 28, 1888.

Original No. 320,513, dated June 23, 1885. Application for reissue filed March 23, 1886. Serial No. 196,298.

*To all whom it may concern:*

Figures 1, 2:
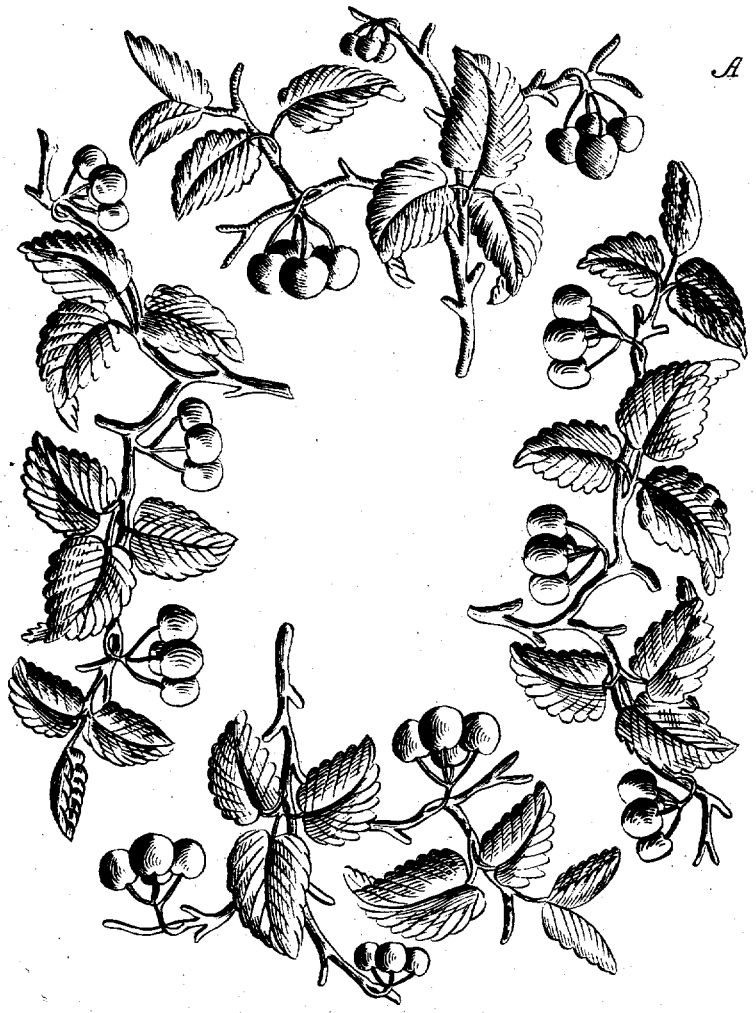
Figure 3:
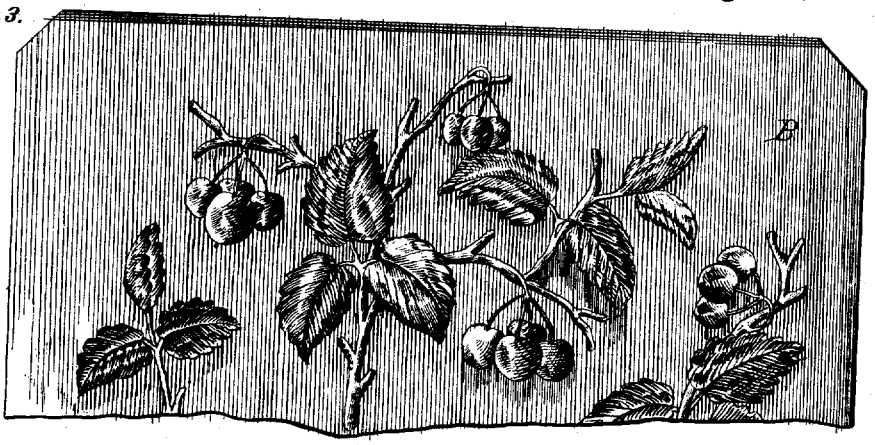
Figure 4:
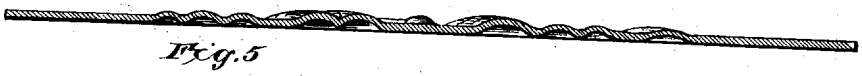
Figure 5:
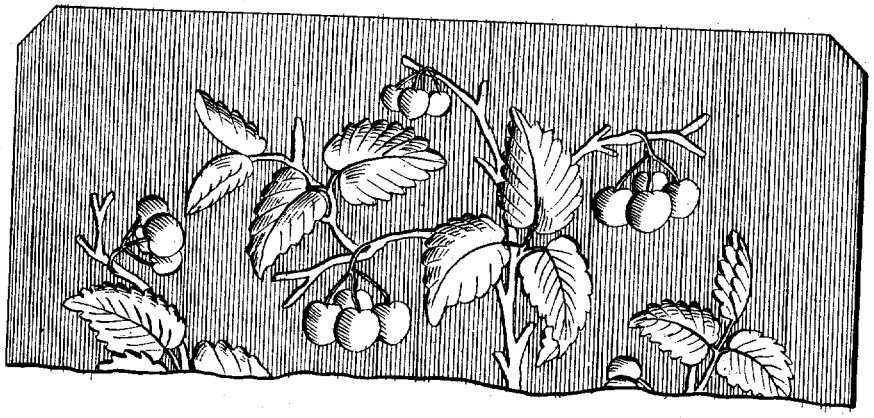
Figure 6:
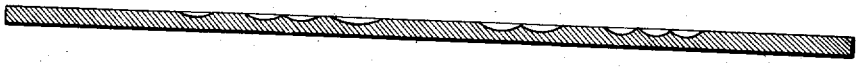
Figure 7:
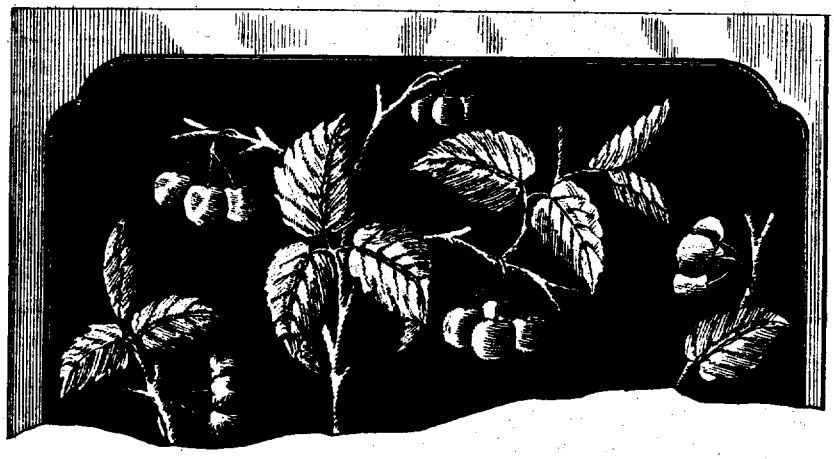
Figure 8:
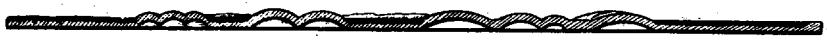
Figure 9:
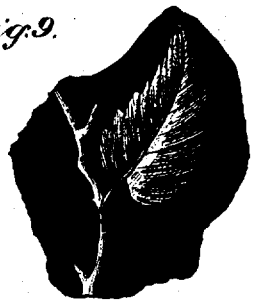
Figure 10:
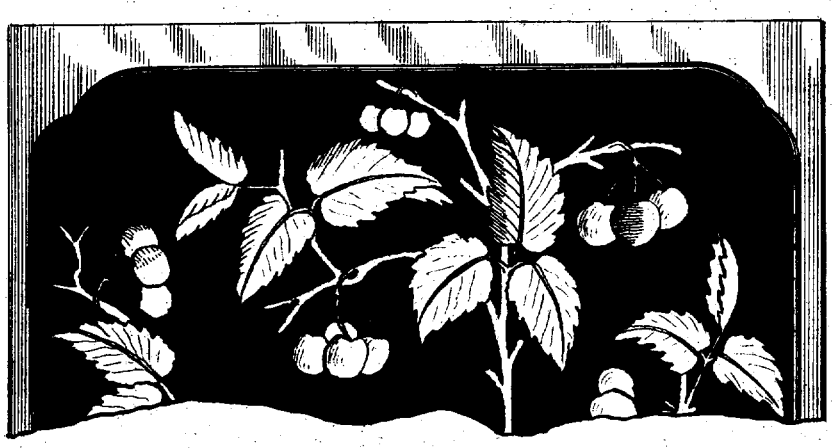
Figure 11:
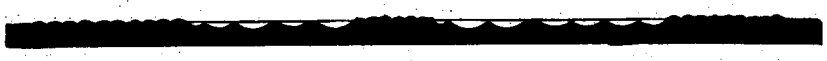
Figure 12:
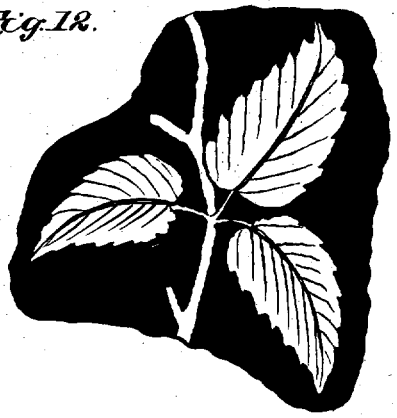

Be it known that I, JAMES W. TUFTS, a citizen of the United States, residing at Medford, in the county of Middlesex and State of Massachusetts, have invented an Improved Method of Making Dies for Producing Ornamental Designs on Britannia and other Soft Metals, of which the following is a full, clear, and exact description, reference being had to the accompanying drawings, making part of this specification, in which- Figure 1 is a top view of a plate, showing the design as it appears depressed into or dug out of the plate originally used. Fig. 2 is a detail view of the same in cross-section, showing clearly the depressions formed by the configurations on the plate. Fig. 3 is a front view of a soft-metal plate which has been impressed into the depressions in the plate shown in the first figure. Fig. 4 is a cross-section of Fig. 3, showing the depressions on the one side and the protuberances on the other. Fig. 5 is a detail top view of Fig. 1, surface-shaded to more clearly show the depressions. Fig. 6 is a cross-section of Fig. 5, showing clearly the depressions in the plate. Fig. 7 is a top view of a plate of soft metal as it appears after the leaves have been engraved with fine lines thereon to imitate natural leaves. Fig. 8 is a cross-section of Fig. 7. Fig. 9 is an enlarged detail view of a portion of Fig. 7. Fig. 10 is a top view of the electrotype-die as it appears when taken from the plate (shown in Fig. 7) where it has been deposited in the bath. Fig. 11 is a cross-section of Fig. 10. Fig. 12 is an enlarged detail view of a portion of the electrotype-die.

My invention relates to an improved method of producing ornamental designs on britannia and other soft metals, whereby an exact imitation of finely-engraved work can be easily and cheaply produced; and my invention consists in a novel method of making dies for producing said designs, as is hereinafter fully described, and specifically pointed out in the claim.

The operation of making my electrotype-die is as follows: I take first the plate A, of brass or other suitable metal, and punch, dig out, or depress the desired outline upon the die in intaglio by hand, as shown in Fig. 1, and more clearly in Fig. 2. Then take a plate, B, and press the same into the depressions in the plate shown in Fig. 1, which produces the figures in cameo on the plate B, as shown in Figs. 3 and 4. The plate B, (shown in Fig. 3,) which is an exact counterpart of Fig. 1, showing the leaves in cameo, is then taken and ornamented by hand in any suitable manner. In this instance I show in Fig. 7 the leaves as they appear when finely engraved to imitate natural leaves. We have then the plated ornamental design finely cut upon a soft-metal plate, and thus an electrotype-plate is taken by suspending it in the decomposing-trough containing the usual solution and connected with the battery in the usual manner, where it is allowed to remain until the deposit is of sufficient thickness to form the face of an intaglio die. By close examination of Figs. 7 and 10 it will be observed that one is a negative counterpart of the other—that is, Fig. 7 clearly shows such a plate as would be produced by impressing metal upon or against the plate shown in Fig. 10.

From the foregoing it will appear that in order to produce any number of highly-ornamental plates upon which will appear any predetermined design all that is necessary is to produce a completed plate similar to the one shown in Fig. 4, and then to take an electrotype of this plate, mount the electrotype upon a hard back, and you have an intaglio die which will make anywhere from a hundred to a thousand impressions upon these soft-metal plates at a trifling expense, which is manifestly a great saving in labor, and, secondly, in the cost of producing the completed article.

The operation of ornamenting a sheet of soft metal from which an article is to be made is performed by placing this sheet over the electrotype-die, and then, by providing the lower face of the presser-die with a counter-die the face of which has the outline of the electro intaglio die on its lower face in cameo, it will be seen at a glance that this cameo die will impress the back of the soft-metal plate, and thus force a corresponding portion of the face of the plate into the intaglio or electro-plate die, thus ornamenting it as above explained.

Electrotype-dies have been made in cylindrical form and mounted upon a steel mandrel, as described in the United States Letters Patent granted to myself and Matthew S. Andrews November 25, 1879, No. 221,985; but these dies have the design in relief, and when the article to be ornamented is passed with a heavy pressure in contact with such a die it is elongated by the rolling action thereof, which causes the design to become distorted or changed from its original shape; but where my improved design is employed there is no rolling of the article to be ornamented, and, secondly, it is not elongated, and no change in the shape of the figures or lines forming the design results, as the pressure is produced with an ordinary vertical press.

Flat electrotype-dies mounted upon a metal backing have also been used; hence I make no broad claim to the electrotype-die, either flat or cylindrical.

What I claim as my invention, and desire to secure by Letters Patent, is—

The process of making an intaglio electrotype-die, which consists in producing the desired design in intaglio and in the rough by hand in a metal block or plate then taking from the mold thus made a soft-metal counterpart, then finishing such counterpart by producing the desired ornamentation thereon by hand, and finally taking an electrotype from said finished counterpart to form the die or mold, substantially as set forth.

In testimony that I claim the above I hereunto subscribe my name in presence of two witnesses.

JAMES W. TUFTS.

Witnesses:
CHAS. A. HARDING,
WM. H. CUMMINGS.